(12) United States Patent
Chen et al.

(10) Patent No.: US 11,574,752 B2
(45) Date of Patent: Feb. 7, 2023

(54) MAGNETO-DIELECTRIC MATERIALS, METHODS OF MAKING, AND USES THEREOF

(71) Applicant: ROGERS CORPORATION, Chandler, AZ (US)

(72) Inventors: Yajie Chen, Brighton, MA (US); Robert C. Daigle, Paradise Valley, AZ (US); Li Zhang, Sichuan (CN)

(73) Assignee: ROGERS CORPORATION, Chandler, AZ (US)

( * ) Notice: Subject to any disclaimer, the term of this patent is extended or adjusted under 35 U.S.C. 154(b) by 214 days.

(21) Appl. No.: 16/930,907

(22) Filed: Jul. 16, 2020

(65) Prior Publication Data

US 2021/0020343 A1 Jan. 21, 2021

Related U.S. Application Data

(60) Provisional application No. 62/874,567, filed on Jul. 16, 2019.

(51) Int. Cl.
*H01F 1/34* (2006.01)
*C01G 53/00* (2006.01)
(Continued)

(52) U.S. Cl.
CPC ............. *H01F 1/344* (2013.01); *C01G 53/40* (2013.01); *C08K 3/22* (2013.01); *C08K 7/08* (2013.01);
(Continued)

(58) Field of Classification Search
CPC ....... H01F 1/344; H01F 1/0315; C04B 35/26; C01G 53/40; C01P 2002/32;
(Continued)

(56) References Cited

U.S. PATENT DOCUMENTS 4,559,191 A * 12/1985 Arons ................. H01F 1/344
264/172.16
4,567,101 A * 1/1986 David ................. C01G 53/00
423/594.3
(Continued)

FOREIGN PATENT DOCUMENTS

CN 101100374 A 1/2008
CN 101104556 1/2008
(Continued)

OTHER PUBLICATIONS

Shen et al. "A simple process for magnetic nanocrystalline porous Co—Fe alloy hollow microfibers", Materials Letters, 65 (2011) 2841-2843. Published online May 30, 2011 (Year: 2011).*
(Continued)

*Primary Examiner* — Jane L Stanley
(74) *Attorney, Agent, or Firm* — Cantor Colburn LLP

(57) ABSTRACT

A magnetic fiber comprises a core comprising a spinel ferrite of formula $Me_{1-x}M_xFe_yO_4$, wherein Me is Mg, Mn, Fe, Co, Ni, Cu, Zn, or a combination thereof, x=0 to 0.25, and y=1.5 to 2.5, wherein the core is solid or at least partially hollow; and a shell at least partially surrounding the core, and comprising a $Me_{1-x}M_xFe_y$ alloy, wherein when the core is solid with Me=Ni and x=0 the magnetic fiber has a diameter of greater than 0.3 micrometer. A magneto-dielectric material having a magnetic loss tangent of less than or equal to 0.03 at 1 GHz comprises a polymer matrix; and a plurality of the magnetic fibers.

25 Claims, 3 Drawing Sheets

(51) Int. Cl.

| | | |
|---|---|---|
| C08K 3/22 | (2006.01) | |
| C08K 7/08 | (2006.01) | |
| C08K 9/02 | (2006.01) | |
| D01D 5/06 | (2006.01) | |
| D01D 10/02 | (2006.01) | |

(52) U.S. Cl.
CPC ............ *C08K 9/02* (2013.01); *C01P 2002/32* (2013.01); *C01P 2006/42* (2013.01); *C08K 2003/2293* (2013.01); *C08K 2201/01* (2013.01); *D01D 5/06* (2013.01); *D01D 10/02* (2013.01); *D10B 2101/02* (2013.01)

(58) Field of Classification Search
CPC ....... C01P 2006/42; D01D 5/06; D01D 10/02; D10B 2101/02; C08K 3/22; C08K 7/08; C08K 9/02; C08K 2003/2293; C08K 2201/01

See application file for complete search history.

(56) References Cited

U.S. PATENT DOCUMENTS

| | | | |
|---|---|---|---|
| 4,725,490 A * | 2/1988 | Goldberg ............. | H01Q 17/005 343/756 |
| 5,110,651 A | 5/1992 | Massard et al. | |
| 5,143,583 A | 9/1992 | Marchessault et al. | |
| 6,436,307 B1 | 8/2002 | Lebourgeois et al. | |
| 7,029,514 B1 | 4/2006 | Yang et al. | |
| 7,329,758 B1 | 2/2008 | Grubbs | |
| 8,305,281 B2 | 11/2012 | Suetsuna et al. | |
| 9,138,727 B2 | 9/2015 | Greenlee | |
| 9,589,716 B2 | 3/2017 | Doljack et al. | |
| 9,596,755 B2 | 3/2017 | Sethumadhavan et al. | |
| 9,638,639 B2 | 5/2017 | Fan et al. | |
| 9,767,944 B2 | 9/2017 | Galland et al. | |
| 10,468,169 B2 | 11/2019 | Chen et al. | |
| 2003/0059609 A1 | 3/2003 | Rodgers | |
| 2003/0129405 A1 | 7/2003 | Zhang et al. | |
| 2003/0190475 A1 | 10/2003 | Carpenter et al. | |
| 2004/0054029 A1 | 3/2004 | Fujiki et al. | |
| 2005/0003199 A1 | 1/2005 | Takaya et al. | |
| 2005/0216075 A1 | 9/2005 | Wang et al. | |
| 2006/0060690 A1 * | 3/2006 | Aisenbrey .............. | B64D 43/00 244/133 |
| 2006/0154052 A1 | 7/2006 | Waffenschmidt et al. | |
| 2007/0231614 A1 | 10/2007 | Kondo et al. | |
| 2008/0096009 A1 | 4/2008 | Xiao et al. | |
| 2009/0101873 A1 | 4/2009 | Tan et al. | |
| 2009/0266604 A1 | 10/2009 | Tetsuji | |
| 2010/0000769 A1 | 1/2010 | Ohmi et al. | |
| 2010/0060539 A1 | 3/2010 | Suetsuna et al. | |
| 2010/0231433 A1 | 9/2010 | Tishin et al. | |
| 2011/0104073 A1 | 5/2011 | Zeng et al. | |
| 2011/0147643 A1 | 6/2011 | Ryou et al. | |
| 2011/0151377 A1 | 6/2011 | Gray et al. | |
| 2012/0038532 A1 | 2/2012 | Yonetsu et al. | |
| 2012/0049100 A1 | 3/2012 | Yonetsu et al. | |
| 2012/0068103 A1 | 3/2012 | Hill et al. | |
| 2013/0063296 A1 | 3/2013 | Hennig et al. | |
| 2013/0140076 A1 | 6/2013 | Lee et al. | |
| 2014/0162868 A1 | 6/2014 | Greenlee | |
| 2015/0310971 A1 | 10/2015 | Kmetz et al. | |
| 2016/0099498 A1 | 4/2016 | Pance et al. | |
| 2016/0113113 A1 | 4/2016 | Sethumadhavan et al. | |
| 2016/0276072 A1 | 9/2016 | Sethumadhavan et al. | |
| 2017/0222331 A1 | 8/2017 | Pance et al. | |
| 2018/0151279 A1 | 5/2018 | Ueyama et al. | |
| 2019/0013128 A1 | 1/2019 | Chen et al. | |
| 2019/0081377 A1 | 3/2019 | Hill et al. | |
| 2019/0221343 A1 | 7/2019 | Chen et al. | |
| 2021/0065943 A1 | 3/2021 | Zhang et al. | |

FOREIGN PATENT DOCUMENTS

| | | | | |
|---|---|---|---|---|
| CN | 101545159 | A | 9/2009 | |
| CN | 101914821 | | 12/2010 | |
| CN | 101921104 | A * | 12/2010 | ............ C04B 35/26 |
| CN | 101851814 | B | 11/2012 | |
| CN | 103046163 | A * | 4/2013 | ............... D01F 9/08 |
| CN | 103243417 | A | 8/2013 | |
| CN | 103630674 | B | 3/2014 | |
| CN | 104213250 | A | 12/2014 | |
| CN | 103436994 | B | 10/2015 | |
| EP | 0123530 | A2 | 4/1984 | |
| EP | 2214180 | A1 | 8/2010 | |
| JP | 2000277973 | A | 10/2000 | |
| JP | 2005101474 | A | 4/2005 | |
| JP | 2010238748 | A | 10/2010 | |
| WO | 9523884 | A1 | 9/1995 | |
| WO | 2016149465 | A1 | 9/2016 | |

OTHER PUBLICATIONS

Silva et al "1D hollow MFe2O4 (M=Cu, Co, Ni) fibers by solution blow spinning for oxygen evolution reaction", Journal of Colloid and Interface Science, 540 (2019), 59-65. Published online Jan. 3, 2019 (Year: 2019).*

Gong et al. "Sol-gel synthesis of hollow zinc ferrite fibers", Journal of Sol-Gel Science and Technology, 35, 77-82, 2005. Published Jul. 2005 (Year: 2005).*

Song et al. "Magnetic hard/soft nanocomposite ferrite aligned hollow microfibers and remanence enhancement", Journal of Colloid and Interface Science, 354 (2011), 413-416. Published online Dec. 8, 2010 (Year: 2010).*

Xiang et al. "Fabrication and characterization of Fe—Ni alloy/ nickel ferrite composite nanofibers by electrospinning and partial reduction", Materials Research Bulletin, 46, 2011, 258-261. published online Nov. 4, 2010 (Year: 2010).*

Wei et al. "Double-layer microwave absorber based on nanocrystalline Zn0.5Ni0.5Fe2O4/alpha-Fe microfibers", Materials and Design, 35, 2012, 363-368. published online Sep. 16, 2011 (Year: 2011).*

Han et al.; "Microwave-absorption properties of Fe(Mn)/ferrite nanocapsules"; J. Phys. D: Appl. Phys. 42; (2009) 5 pages.

Jing et al.,"Magnetic and Dielectric Properties of Barium Ferrite Fibers/poly(vinylidene fluoride) Composite Films," Journal of Polymer Research, Kluwer Academic Publishers-Consultants Bureau, NL, Apr. 20, 2011, pp. 2017-2021, vol. 18, No. 6.

Pullar, "Hexagonal Ferrite Fibres and Nanofibres," Trans Tech Publications, 2016, pp. 1-68, vol. 241.

Pullar, "Magnetic Properties of Aligned Co2Z Hexagonal Z-Ferrite Fibers," International Journal of Applied Ceramic Technology, 2014, pp. 451-456, vol. 11, No. 3.

Zhen et al.; "Microwave absorption properties of FeNi3 submicrometre spheres and SiO2@FeNi3 core-shell structures"; J. Phys. D: Appl. Phys. 43; (2010); 7 pages.

Cruz-Montoya et al., "Synthesis and characterization of polymer nanocomposites containing magnetic nanoparticles"; Journal of Applied Physics 107; 09B506 (2010); 4 pgs.

Huang et al; "Magnetic epoxy nanocomposites with superparamegnetic MnFe2O4 nanoparticles"; AIP Advance 5; 097183 (2015); 16 pgs.

Kong et al., "Ni-Zn Ferrites Composites With Almost Equal Values of Permeability and Permittivity for Low-Frequency Antenna Design," IEEE Transactions on Magnetics, Jan. 2007, pp. 6-9, vol. 43, No. 1.

Padron, Simon et al., "Experimental study of nanofiber production through forcespinning", Journal of Applied Physics, 113, 024318 (2013); 9 pages.

Xiang, J et al. 2011 Fabrication and characterization of Fe—Ni alloy/nickel ferrite composite nanofibers by electrospinning and partial reduction, Materials Research Bulletin, vol. 46, Issue 2, Feb. 2011, pp. 258-261.

Mou, Fangzhi et al., "Oriented Contraction: A Facile Nonequilibrium Heat-Treatment Approach for Fabrication of Maghemite Fiber-in-Tube and Tube-in-Tube Nanostructures", Langmuir 2010, 26 (19), pp. 15580-15585.

(56) References Cited

OTHER PUBLICATIONS

Park et al. "Design of Wide bandwidth microwave absorber with Ferrite composites of broad magenetic loss specturm," Advanced Materials Engineering, 2015.
Sreenivasulu, G. et al., "Magnetic field assisted self-assembly of ferrite-ferroelectric core-shell nanofibers and studies on magneto-electric interactions", Applied Physics Letters 104, (2014); 5 pages.
International Search Report for International Application No. PCT/US2020/041498; International filing date Jul. 10, 2020; dated Oct. 29, 2020; 6 pages.
Written Opinion Written Opinion of the International Searching Authority for International Application No. PCT/US2020/041498; International filing date: Jul. 10, 2020; dated Oct. 29, 2020; 9 pages.

* cited by examiner

MAGNETO-DIELECTRIC MATERIALS, METHODS OF MAKING, AND USES THEREOF

CROSS REFERENCE TO RELATED APPLICATIONS

This application claims the benefit of U.S. Provisional Application No. 62/874,567 filed Jul. 16, 2019, which is incorporated by reference in its entirety herein.

BACKGROUND

This disclosure relates generally to magnetic core-shell fibers, magneto-dielectric materials, methods of making the fibers and materials, and uses thereof.

Newer designs and manufacturing techniques have driven electronic components to increasingly smaller dimensions, for example, components such as inductors on electronic integrated circuit chips, electronic circuits, electronic packages, modules, housings, and antennas. One approach to reducing electronic component size has been the use of magneto-dielectric materials as substrates. In particular, ferrites, ferroelectrics, and multiferroics have been widely studied as functional materials with enhanced microwave properties. However, these materials are not entirely satisfactory in that they often do not provide the desired bandwidth and they can exhibit a high magnetic loss at high frequencies, such as in the gigahertz range.

However, current magneto-dielectric composites often exhibit various undesirable characteristics that have limited their adoption or utility, including one or more (or all) of low effective permeability for composites at frequencies greater than 1.0 gigahertz (GHz), high magnetic loss for composites at frequencies greater than 1.0 GHz, mismatched impedance for composites (primarily permittivity being much greater than permeability), low mechanical strength with large size magnetic filler, and high weight due to density of ferrite fillers or magnetic alloy fillers.

There accordingly remains a need in the art for a magneto-dielectric material with a low magnetic loss in the gigahertz range.

BRIEF SUMMARY

A magnetic fiber comprises a core comprising a spinel ferrite of formula $Me_{1-x}M_xFe_yO_4$, wherein Me is Mg, Mn, Fe, Co, Ni, Cu, Zn, or a combination thereof; M is Zn, Mg, Co, Cu, Al, Cr, Mn, or a combination thereof, x=0 to 0.25, and y=1.5 to 2.5, wherein the core is solid or at least partially hollow; and a shell at least partially surrounding the core, and comprising a $Me_{1-x}M_xFe_y$ alloy, wherein when the core is solid with Me=Ni and x=0 the magnetic fiber has a diameter of greater than 0.3 micrometer.

A method of making the magnetic fiber comprises preparing a fiber from metal source compounds for the spinel ferrite; calcining the fiber to synthesize the spinel ferrite and obtain the core; and reducing the core in an atmosphere comprising hydrogen, nitrogen, argon, or a combination thereof to form the shell of the magnetic fiber.

A magneto-dielectric material comprises a polymer matrix; and a plurality of the magnetic fibers; wherein the magneto-dielectric material has a magnetic loss tangent of less than or equal to 0.03 at 1 GHz.

A method of making the magneto-dielectric material comprises combining a polymer, a plurality of the magnetic fibers, optionally a solvent, and optionally an additive composition to form a composition; optionally removing the solvent from the composition; and cooling the composition to provide the magneto-dielectric material.

Articles comprising the magneto-dielectric material are also described, including an antenna, a transformer, an anti-electromagnetic interference material, or an inductor.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

It was surprisingly discovered that magneto-dielectric materials comprising a polymer matrix and a plurality of magnetic fibers having a spinel ferrite core at least partially surrounded by an alloy shell showed improved properties such as high permeability, low dielectric constant, and low magnetic and dielectric loss over a frequency range of 1-5 GHz. It was found that the magneto-dielectric material can have a magnetic loss tangent at 1 GHz, or 1 to 10 GHz of less than or equal to 0.03. Magneto-dielectric materials with such a low magnetic loss can advantageously be used in high frequency applications such as in antenna applications.

The magnetic fibers have a core-shell structure. The fiber core comprises a spinel ferrite of formula $Me_{1-x}M_xFe_yO_4$. Me can be Mg, Mn, Fe, Co, Ni, Cu, Zn, or a combination thereof. Preferably Me is Ni, Mn, Co, Mg, Li, or a combination thereof. More preferably Me is Ni. M can be Zn, Mg, Co, Cu, Al, Cr, Mn, or a combination thereof; x=0 to 0.25; and y=1.5 to 2.5. The choice and quantity of the metal Me and dopant M in the spinel ferrite are selected to provide the magnetic fiber with the desired magneto-dielectric properties.

Grain size of the spinel ferrite is selected to provide the magnetic fiber with the magneto-dielectric properties suitable for a given application. Grain size can be controlled by control of ferrite synthesis conditions, for example the temperature, time of heating, and rate of heating or cooling. The average grain size of the spinel ferrite can be 5 nanometers to 500 nanometers, or 10 nanometers to 100 nanometers, or 10 nanometers to 30 nanometers, or 30 nanometers to 60 nanometers, or 60 nanometers to 100 nanometers, or 100 nanometers to 200 nanometers, or 200 nanometers to 500 nanometers. Preferably the average grain size is 10 nanometers to 100 nanometers. Grain size can be determined by X-ray diffractometry (XRD), scanning electron microscopy (SEM), transmission electron microscopy (TEM), or a combination thereof.

The core can be solid, at least partially hollow, or a tube.

The shell of the magnetic fiber at least partially surrounds the core. For example, the shell can cover 5 to 100%, or 10 to 80%, or 10 to 50% of the total surface area of the core material. The shell can have a thickness of 20 nanometers to 2 micrometers, preferably 50 nanometers to 500 nanometers. The shell of the magnetic fibers comprises a $Me_{1-x}M_xFe_y$ alloy. Me can be Mg, Mn, Fe, Co, Ni, Cu, Zn, or a combination thereof. Preferably Me is Ni, Mn, Co, Mg, Li, or a combination thereof. More preferably Me is Ni. M can be Zn, Mg, Co, Cu, Al, Cr, Mn, or a combination thereof; $x=0$ to 0.25; and $y=1.5$ to 2.5. The shell thickness as well as the identity and quantity of the metal Me and dopant M in the shell are selected to provide the magnetic fiber with the desired magneto-dielectric properties.

In some embodiments of the magnetic fiber, Me, M, x, and y are identical in the core ferrite and the shell alloy.

Figure 1:
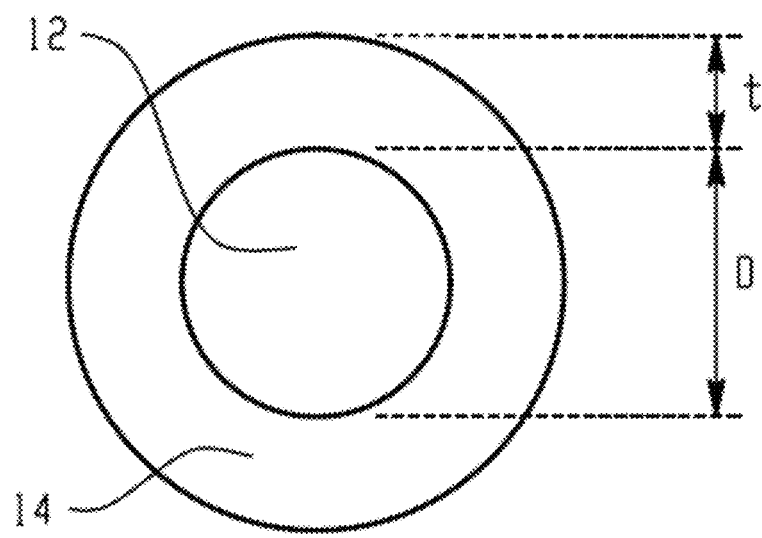
FIG. 1 is a cross-sectional illustration of an embodiment of a magnetic fiber with a solid core.

The magnetic fiber can have a diameter of 0.1 micrometer to 20 micrometers, preferably a diameter of 0.3 micrometer to 10 micrometers. When the core is solid, and Me is Ni with $x=0$, the magnetic fiber has a diameter of greater than 0.3 micrometer. FIG. 1 is an illustration of a cross-section of a magnetic fiber having a core 12 and a shell 14. The diameter of core 12 of the fiber is the diameter, D, and the shell thickness is the thickness, t. The magnetic fiber can comprise a discrete boundary between the core and the shell (for example, as illustrated in FIG. 1), or a diffuse boundary can be present between the core and the shell, where the concentration of alloy increases from a location on the diffuse boundary with increasing distance from a center of the fiber for a distance until the concentration optionally plateaus with further increasing distance from the center to the surface of the fiber.

Figure 2:
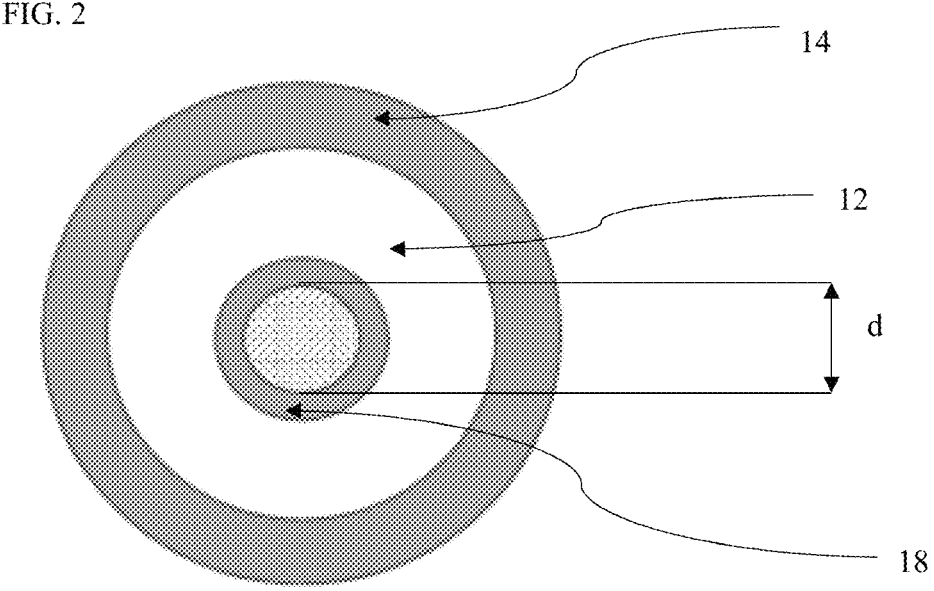
FIG. 2 is a cross-sectional illustration of an embodiment of a magnetic fiber with a hollow tube core.

When the core is in the form of a tube, the inner diameter of the tubular core can have an average value of 0.01 micrometer to 3 micrometers. Preferably the inner diameter has an average value of 0.05 micrometer to 1 micrometer. FIG. 2 is a cross-sectional illustration of a magnetic fiber with a shell 14 and a hollow tube core 12, with inner diameter, d. The inner surface 18 of the tubular core 12 can also form a thin layer of alloy during the reduction process, as represented in FIG. 2.

Diameter of the fiber or the inner diameter can be determined by scanning electron microscopy.

The length of the magnetic fiber can be 0.5 micrometer to 5000 micrometers, 3 micrometers to 4000 micrometers, or 1 micrometer to 1000 micrometers. Preferably the length is 1 micrometer to 1000 micrometers. Length of the fiber can be determined by scanning electron microscopy or optical microscopy.

The magnetic fibers can have an aspect ratio referring to a longest dimension to a shortest dimension (for example, a fiber length to a fiber diameter) of greater than or equal to 1, greater than or equal to 5, or greater than or equal to 10. The aspect ratio can be less than or equal to 20,000, less than or equal to 500, or less than or equal to 1000. Preferably the aspect ratio is 5 to 1000.

The magnetic fiber can be made by preparing a fiber from metal source compounds for the spinel ferrite; calcining the fiber to obtain the core; and reducing the core in an atmosphere comprising hydrogen, nitrogen, argon, or a combination thereof to form the shell of the magnetic fiber. The method of making the magnetic fiber can further comprise drying the fiber to remove solvent or reducing the length of the magnetic fiber to a desired length.

The fiber can be prepared from metal source compounds by any suitable method. For example, the fiber can be prepared by electrospinning, centrifugal spinning, or mechanical spinning of a solution comprising the metal source compounds. A metal source compound is a compound needed for synthesis of the spinel ferrite. The metal source compounds can be selected to be soluble in a solvent and based on factors such as cost and availability. Exemplary source compounds for a given metal include nitrate salts, acetate salts, sulfate salts, or chloride salts of the metal. The spinning solution can contain 1 to 30 weight percent (wt. %), or 2.5 wt. % to 25 wt. %, or 5 wt. % to 20 wt. % of the metal source compounds.

Suitable solvents for the solution include a $C_{1-12}$ alcohol, ketone, ester, water, and/or mixtures thereof. Other components can be added to the solvent to adjust its pH, such as acidic components, including organic acids, e.g., citric acid, acetic acid, formic acid, nitric acid, oleic acid, and the like. In one aspect, the solvent can be an aqueous medium including water with optionally one or more soluble salts and optionally one or more $C_{1-12}$ alcohols, ketones, esters, and/or organic acids. The solvent can be an aqueous solvent which includes at least 50% by weight of water and one or more other components such as an organic acid or a $C_{1-12}$ alcohol, ketone, ester, or soluble salt or mixtures thereof. Preferably, the solvent has a boiling point below about 200° C., e.g., below about 120° C. Preferred solvents comprise water or ethanol.

The solution of the metal source compounds can further comprise a polymeric binder. The binder is selected for solubility in the solvent and also to be removable from the spun fiber by heating. Examples of a suitable binder include polyvinylpyrrolidone (PVP), poly(vinyl alcohol) (PVA), polyacrylamide (PAM), poly(acrylic acid) (PAA), polyethylene glycol (PEG), polyethylene oxide (PEO), cellulose acetate, starch, polypropylene carbonate, polyvinyl butyral (PVB), and a combination thereof. The spinning solution can contain 1 to 30 wt. %, or 2.5 wt. % to 25 wt. %, or 5 wt. % to 20 wt. % of the polymeric binder.

Calcining the fiber to obtain the core can be performed at a suitable temperature for a length of time to synthesize the desired ferrite and achieve a desired grain size. For example, the temperature can be 200° C. to 1500° C., or 300° C. to 1350° C., or 400° C. to 1200° C. The length of time the fiber is calcined can be, for example 0.5 hour to 15 hours, or 1 hour to 10 hours, or 2 hours to 8 hours. The heating rate or the cooling rate for calcining in a furnace can also be selected to obtain a desired ferrite, grain size, or structural morphology. For example, the heating rate or the cooling rate can be 2 to 3° C./minute.

The as-spun fiber can optionally be dried to remove the spinning solvent prior to calcining the fiber. Drying the fiber to remove solvent can be performed at a temperature and for a length of time suitable for removing the solvent. For example, the temperature can be 80° C. to 150° C. The length of time can be 1 hour to 10 hours.

Reducing the core in an atmosphere comprising hydrogen, nitrogen, argon, or a combination thereof to form the shell of the magnetic fiber can be performed at a suitable temperature for a length of time to produce a shell of a magnetic alloy of a selected thickness. Preferably the atmosphere comprises hydrogen. The temperature for the reduction process can be 85° C. to 1300° C., or 90° C. to 1200° C., or 95° C. to 1100° C., or 100° C. to 1000° C.

The length of the magnetic fibers produced by the method can be reduced to a desired length using any suitable method. Examples of methods to reduce the length of the magnetic fibers include ultrasonication, mechanical vibration, mechanical milling, and a combination thereof.

Structure and morphology of the magnetic fibers can be characterized by any suitable method. Examples of such methods include X-ray diffraction, scanning electron microscopy, field emission scanning electron microscopy, transmission electron microscopy, and selected area electron diffraction.

Magnetic characterization of the magnetic fibers or the magneto-dielectric material can be performed using any suitable method. For example, a vibrating sample magnetometer can be used to characterize the magnetic properties. Alternatively magnetic properties, including magnetic loss tangent, can be determined by measurement of S-parameters with a vector network analyzer using the Nicolson-Ross-Weir (NRW) method over a frequency range of 0.1-18 GHz.

The magneto-dielectric material comprises a polymer matrix and a plurality of the magnetic fibers. The magneto-dielectric material can comprise 5 to 60 volume percent (vol %), or 10 to 50 vol %, or 15 to 45 vol %, of magnetic fibers based on the total volume of the magneto-dielectric material.

Figure 3:
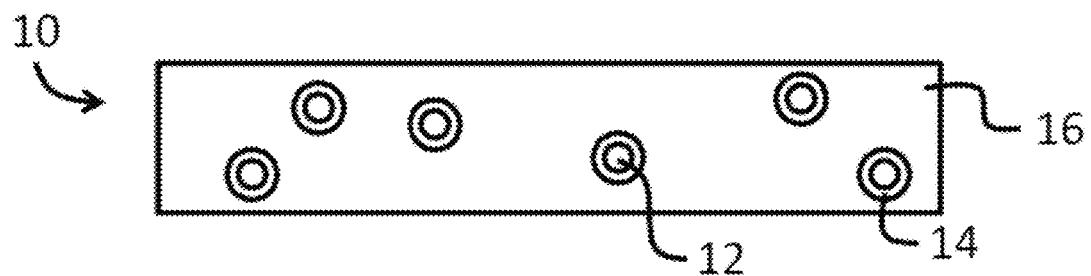
FIG. 3 is an illustration of an embodiment of a magneto-dielectric material comprising aligned magnetic fibers with solid cores.
Figure 4:
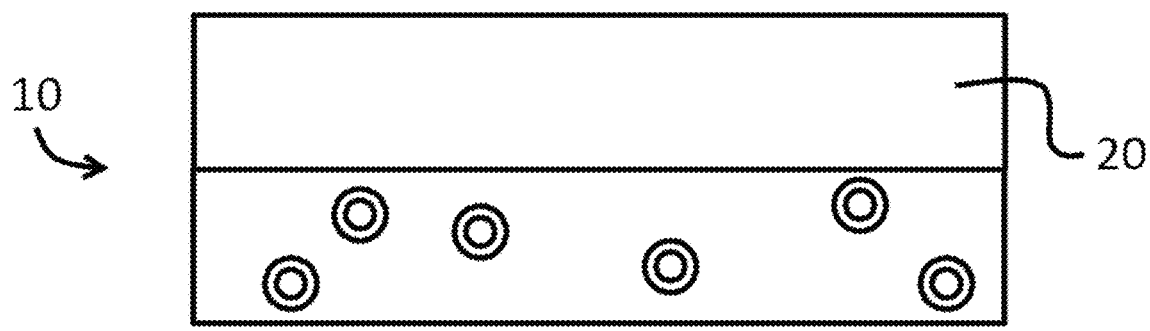
FIG. 4 is an illustration of an aspect of a conductive layer disposed on the magneto-dielectric material.
Figure 5:
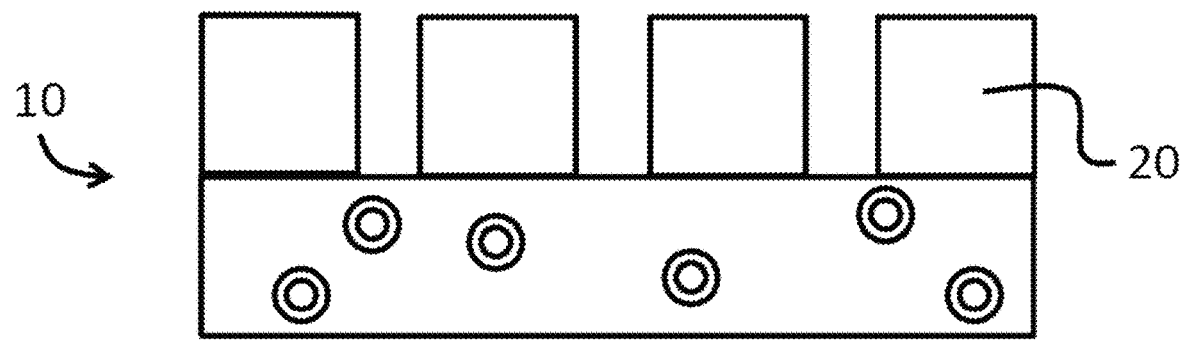
FIG. 5 is an illustration of an aspect of a patterned conductive layer disposed on the magneto-dielectric material.

An illustration of an aspect of the magneto-dielectric material is illustrated in FIGS. 3-5. FIG. 3 illustrates a magneto-dielectric material 10 comprising a polymer matrix 16 and a plurality of aligned core-shell magnetic fibers comprising core 12 and shell 14. FIG. 4 illustrates that the magneto-dielectric material can further comprise conductive layer 20. FIG. 5 illustrates that the conductive layer 20 can be patterned.

The polymer matrix can comprise a thermoset or a thermoplastic polymer, including a liquid crystalline polymer. The polymer can comprise a polycarbonate, a polystyrene, a polyphenylene ether, a polyimide (e.g., polyetherimide), a polybutadiene, a polyacrylonitrile, a poly($C_{1-12}$ alkyl)methacrylate (e.g., polymethylmethacrylate (PMMA)), a polyester (e.g., poly(ethylene terephthalate), poly(butylene terephthalate), or polythioester), a polyolefin (e.g., polypropylene (PP), high density polyethylene (HDPE), low density polyethylene (LDPE), or linear low density polyethylene (LLDPE)), a polyamide (e.g., polyamideimide), a polyarylate, a polysulfone (e.g., polyarylsulfone or polysulfonamide), a poly(phenylene sulfide), a poly(phenylene oxide), a polyethers (e.g., poly(ether ketone) (PEK), poly(ether ether ketone) (PEEK), polyethersulfone (PES)), a polyacrylic, a polyacetal, a polybenzoxazoles (e.g., polybenzothiazole or polybenzothiazinophenothiazine), a polyoxadiazole, a polypyrazinoquinoxaline, a polypyromellitimide, a polyquinoxaline, a polybenzimidazole, a polyoxindole, a polyoxoisoindoline (e.g., polydioxoisoindoline), a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyacetal, a polyanhydride, a vinyl polymer (e.g., a poly(vinyl ether), a poly(vinyl thioether), a poly(vinyl alcohol), a poly(vinyl ketone), a poly(vinyl halide) (such as polyvinylchloride), a poly(vinyl nitrile), or a poly(vinyl ester)), a polysulfonate, a polysulfide, a polyurea, a polyphosphazene, a polysilazane, a polysiloxane, a fluoropolymer (e.g., poly(vinyl fluoride) (PVF), poly(vinylidene fluoride) (PVDF), fluorinated ethylene-propylene (FEP), polytetrafluoroethylene (PTFE), or polyethylenetetrafluoroethylene (PETFE)), or a combination thereof. Preferably, the polymer can comprise a poly(ether ether ketone), a poly(phenylene oxide), a polycarbonate, a polyester, an acrylonitrile-butadiene-styrene copolymer, a styrene-butadiene copolymer, a styrene-ethylene-propylene copolymer, a nylon, or a combination thereof. The polymer can comprise a high-temperature nylon. The polymer can comprise a polyethylene (such as a high-density polyethylene). The polymer matrix can comprise a polyolefin, a polyurethane, a polyethylene (such as polytetrafluoroethylene), a silicone (such as polydimethylsiloxane), a polyether (such as poly(ether ketone) and poly(ether ether ketone)), poly(phenylene sulfide), or a combination thereof.

The polymer of the polymer matrix composition can comprise a thermosetting polybutadiene or polyisoprene. As used herein, the term "thermosetting polybutadiene or polyisoprene" includes homopolymers and copolymers comprising units derived from butadiene, isoprene, or mixtures thereof. Units derived from other copolymerizable monomers can also be present in the polymer, for example, in the form of grafts. Copolymerizable monomers include, but are not limited to, vinylaromatic monomers, for example, substituted and unsubstituted monovinylaromatic monomers such as styrene, 3-methylstyrene, 3,5-diethylstyrene, 4-n-propylstyrene, alpha-methylstyrene, alpha-methyl vinyltoluene, para-hydroxystyrene, para-methoxystyrene, alpha-chlorostyrene, alpha-bromostyrene, dichlorostyrene, dibromostyrene, tetra-chlorostyrene, and the like; and substituted and unsubstituted divinylaromatic monomers such as divinylbenzene, divinyltoluene, and the like. Combinations comprising copolymerizable monomers can be used. Thermosetting polybutadienes or polyisoprenes include, but are not limited to, butadiene homopolymers, isoprene homopolymers, butadiene-vinylaromatic copolymers such as butadiene-styrene, isoprene-vinylaromatic copolymers such as isoprene-styrene copolymers, and the like.

The thermosetting polybutadiene or polyisoprene polymers can also be modified. For example, the polymers can be hydroxyl-terminated, methacrylate-terminated, carboxylate-terminated, or the like. Post-reacted polymers can be used, such as epoxy-, maleic anhydride-, or urethane-modified polymers of butadiene or isoprene polymers. The polymers can also be crosslinked, for example, by divinylaromatic compounds such as divinyl benzene, e.g., a polybutadiene-styrene crosslinked with divinyl benzene. Polymers are broadly classified as "polybutadienes" by their manufacturers, for example, Nippon Soda Co., Tokyo, Japan, and Cray Valley Hydrocarbon Specialty Chemicals, Exton, Pa. Mixtures of polymers can also be used, for example, a mixture of a polybutadiene homopolymer and a poly(butadiene-isoprene) copolymer. Combinations comprising a syndiotactic polybutadiene can also be useful.

A curing agent can be used to cure the thermosetting polybutadiene or polyisoprene composition to accelerate the curing reaction. Curing agents can comprise organic peroxides, for example, dicumyl peroxide, t-butyl perbenzoate, 2,5-dimethyl-2,5-di(t-butyl peroxy)hexane, α,α-di-bis(t-butyl peroxy)diisopropylbenzene, 2,5-dimethyl-2,5-di(t-butyl peroxy) hexyne-3, or a combination thereof. Carbon-carbon initiators, for example, 2,3-dimethyl-2,3 diphenylbutane can be used. Curing agents or initiators can be used alone or in combination. The amount of curing agent can be 1.5 to 10 weight percent (wt %) based on the total weight of the polymer in the polymer matrix.

The polymer matrix can comprise a norbornene polymer derived from a monomer composition comprising a norbornene monomer, a norbornene-types monomer, or a combination thereof.

The polynorbornene matrix can be derived from a monomer composition comprising one or both of a norbornene monomer and a norbornene-type monomer, as well as other optional co-monomers. A repeat unit derived from norbornene is shown below in Formula (I).

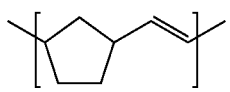
(I)

Norbornene-type monomers include tricyclic monomers (such as dicyclopentadiene and dihydrodicyclopentadiene); tetracyclic monomers (such as tetracyclododecene); and pentacyclic monomers (such as tricyclopentadiene); heptacyclic monomers (such as tetracyclopentadiene). A combination thereof can be used. One of the foregoing monomers can be used to obtain a homopolymer or two or more can be combined to obtain a copolymer.

The norbornene-type monomer can comprise dicyclopentadiene such that the polynorbornene matrix comprises a repeat unit derived from the dicyclopentadiene as illustrated below in Formula (II).

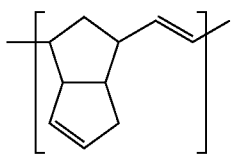
(II)

The polynorbornene matrix can comprise 50 to 100 weight percent (wt %), or 75 to 100 wt %, or 95 to 100 wt % of repeat units derived from dicyclopentadiene based on the total weight of the polynorbornene matrix.

The norbornene-type monomer can comprise a functional group such an alkyl group (e.g., methyl, ethyl, propyl, or butyl), an alkylidene group (e.g., ethylidene), an aryl group (e.g., phenyl, tolyl, or naphthyl), a polar group (e.g., ester, ether, nitrile, or halogen), or a combination thereof. An example of a norbornene-type monomer with an ethylidene functional group is ethylidene norbornene, as shown below in Formula (III).

(III)

The functionalized repeat unit can be present in the polynorbornene matrix in an amount of 5 to 30 wt %, or 15 to 28 wt %, or 20 to 25 wt % based on the total weight of the polynorbornene matrix.

The polynorbornene matrix can contain less than or equal to 20 wt % of at least one of a repeat unit derived from a copolymerizable monomer based on the total weight of the polynorbornene matrix. The copolymerizable monomer can comprise a monocycloolefin, a bicycloolefin, or a combination thereof. The monocycloolefin and the bicycloolefin can each independently comprise 4 to 16 carbon atoms, or 4 to 8, or 8 to 12 carbon atoms. The bicycloolefin can comprise 1 to 4 double bonds, or 2 to 3 double bonds. The copolymerizable monomer can comprise norbornadiene, 2-norbornene, 5-methyl-2-norbornene, 5-hexyl-2-norbornene, 5-ethylidene-2-norbornene, vinylnorbornene, 5-phenyl-2-norbornene, cyclobutene, cyclopentene, cyclopentadiene, cycloheptene, cyclooctene, cyclooctadiene, cyclodecene, cyclododecene, cyclododecadiene, cyclododecatriene, norbornadiene, or a combination comprising at least of the foregoing.

The polynorbornene matrix can be formed by ring-opening metathesis polymerization (ROMP) of the monomer in the presence of a catalyst system comprising a metathesis catalyst and an activating agent. The catalyst system can optionally comprise a moderator, a fluorinated compound, a chelating agent, a solvent, or a combination thereof.

The magneto-dielectric material can further comprise additives such as a dielectric filler, a thermoconductive filler, a flame retardant, or a combination thereof. The particular choice of additives depends on the particular application of the magneto-dielectric material, and the desired properties for that application, and are selected so as to enhance or not substantially adversely affect the desired properties, such as thermal conductivity, dielectric constant, dissipation factor, dielectric loss, or other desired properties. When an additive is present in the magneto-dielectric material, up to 60 weight percent, or 0.1 to 40 weight percent, or 0.5 to 30 weight percent, or 1 to 20 weight percent of the additive; wherein each weight percent is based on the total weight of the magneto-dielectric material and weight percent of all components of the magneto-dielectric material total to 100 weight percent.

The dielectric filler can comprise, for example, titanium dioxide (including rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, or a combination thereof.

The dielectric filler can be surface treated with a silicon-containing coating, for example, an organofunctional alkoxy silane coupling agent. A zirconate or titanate coupling agent can be used. Such coupling agents can improve the dispersion of the filler in the polymeric matrix and reduce water absorption of the finished composite circuit substrate. The filler component can comprise 30 to 70 vol % of fused amorphous silica as secondary filler based on the weight of the filler.

The magneto-dielectric material can comprise 5 to 60 vol %, or 10 to 50 vol %, or 15 to 45 vol % of the dielectric filler based on the total volume of the magneto-dielectric material.

The thermoconductive filler can be boron nitride, boron aluminum nitride, alumina, silica, natural graphite, copper, aluminum, magnesium oxide, zinc oxide, diamond powder, silver powder, or a combination thereof. The thermoconductive filler can be present in the magneto-dielectric material in an amount of up to 30 vol %, such as 0 to 30 vol % or 0.1 to 30 vol % based on the volume of the magneto-dielectric material.

The flame retardant can be halogenated or unhalogenated. A flame retardant can be present in an amount known in the art for the particular type of flame retardant used. For example the flame retardant can be present in the magneto-dielectric material in an amount of 0 to 30 vol % based on the volume of the magneto-dielectric material.

The flame retardant can be inorganic and can be present in the form of particles. The inorganic flame retardant can comprise a metal hydrate, having, for example, a volume average particle diameter of 1 to 500 nm, or 1 to 200 nm, or 5 to 200 nm, or 10 to 200 nm; alternatively, the volume average particle diameter can be 500 nm to 15 micrometers, for example, 1 to 5 micrometers. The metal hydrate can comprise a hydrate of a metal such as Mg, Ca, Al, Fe, Zn, Ba, Cu, Ni, or a combination thereof. Hydrates of Mg, Al, or Ca can be used. Examples of hydrates include aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Composites of these hydrates can be used, for example, a hydrate containing Mg and at least one of Ca, Al, Fe, Zn, Ba, Cu, and Ni. A composite metal hydrate can have the formula $MgM_x(OH)_y$ wherein M is Ca, Al, Fe, Zn, Ba, Cu, or Ni, x is 0.1 to 10, and y is 2 to 32. The flame-retardant particles can be coated or otherwise treated to improve dispersion and other properties.

Organic flame retardants can be used, alternatively or in addition to the inorganic flame retardants. Examples of organic flame retardants include melamine cyanurate, fine particle size melamine polyphosphate, various other phosphorus-containing compounds such as aromatic phosphinates, diphosphinates, phosphonates, phosphates, polysilsesquioxanes, siloxanes, and halogenated compounds such as hexachloroendomethylenetetrahydrophthalic acid (HET acid), tetrabromophthalic acid, and dibromoneopentyl glycol. A flame retardant (such as a bromine-containing flame retardant) can be present in an amount of 20 phr (parts per hundred parts of resin) to 60 phr, or 30 to 45 phr based on the total weight of the resin. Examples of brominated flame retardants include Saytex BT93 W (ethylene bistetrabromophthalimide), Saytex 120 (tetradecabromodiphenoxy benzene), and Saytex 102 (decabromodiphenyl oxide).

The flame retardant can be used in combination with a synergist, for example, a halogenated flame retardant can be used in combination with a synergist such as antimony trioxide, and a phosphorus-containing flame retardant can be used in combination with a nitrogen-containing compound such as melamine.

The magnetic fiber itself can increase the flame retardancy of the magneto-dielectric material. For example, the magneto-dielectric material can have an improved flame retardancy as compared to the same material without the magnetic fibers.

The magneto-dielectric material can have improved flammability. For example, the magneto-dielectric material can have a UL94 V1 or V0 rating at 1.6 mm.

The magneto-dielectric material can operate at a high operating frequency of 0.5 to 10 GHz, or 1 to 5 GHz, or 1 to 10 GHz, or greater than or equal to 1 GHz.

The magneto-dielectric material can have a permeability of 1 to 5, or 1 to 3, or at least 4 as determined at 1 GHz, or at 1 to 5 GHz, or at 1 to 10 GHz.

The magneto-dielectric material can have a low magnetic loss tangent of less than or equal to 0.07, or 0.01 to 0.07, or less than or equal to 0.03, or 0.01 to 0.03, or less than or equal to 0.02, or less than or equal to 0.01 as determined at 1 GHz, or at 1 to 5 GHz, or at 1 to 10 GHz.

The magneto-dielectric material can have a low permittivity of less than or equal to 20, or less than or equal to 15, or less than or equal to 10, or less than or equal to 5, or 1 to 10, or 1 to 5 as determined at 1 GHz, or at 1 to 5 GHz, or at 1 to 10 GHz.

The magneto-dielectric material can have a low dielectric loss tangent of less than or equal to 0.005, or less than or equal to 0.001 as determined at 1 GHz, or at 1 to 5 GHz, or 1 to 10 GHz.

A method of making a magneto-dielectric material comprises combining a polymer, a plurality of the magnetic fibers, optionally a solvent, and any additives to form a composition. The polymer can be melted prior to or after combining with the magnetic fibers. Optionally, the method further comprises removing the solvent. The combining can be by any suitable method, such as blending, mixing, or stirring. In an embodiment, the polymer is molten and the magnetic fibers and optional additives are dissolved or dispersed in the molten polymer. In an embodiment, the components used to form the magneto-dielectric material, including the polymer and the magnetic fibers and the optional additives, can be combined by being dissolved or suspended in a solvent to provide a mixture or solution.

The solvent, when included, is selected so as to dissolve the polymer, disperse the magnetic fibers and any other optional additives that can be present, and to have a convenient evaporation rate for forming and drying. A non-exclusive list of possible solvents is xylene; toluene; methyl ethyl ketone; methyl isobutyl ketone; hexane, and higher liquid linear alkanes, such as heptane, octane, nonane, and the like; cyclohexane; isophorone; various terpene-based solvents; and blended solvents. Specific exemplary solvents include xylene, toluene, methyl ethyl ketone, methyl isobutyl ketone, and hexane, and still more specifically xylene and toluene.

The concentration of the components of the composition in the solution or dispersion is not critical and will depend on the solubility of the components, the additive level used, the method of application, and other factors. In general, the solution comprises 10 to 80 weight percent solids (all components other than the solvent), more specifically 50 to 75 weight percent solids, based on the total weight of the solution.

Any solvent is allowed to evaporate under ambient conditions, or by forced or heated air, and the composition is cooled to provide a magneto-dielectric material. The composition can also be shaped by known methods, for example extruding, molding, or casting. For example, the composition can be formed into a layer by casting onto a carrier from which it is later released, or alternatively onto a substrate such as a conductive metal layer that will later be formed into a layer of a circuit structure.

The mixture can be molded, for example, by compression molding, injection molding, reaction injection molding, and the like to form the magneto-dielectric material. The mixture can alternative be extruded or subjected to a rolling technique to form the magneto-dielectric material. Alternatively, the mixture can be impregnated and laminated onto a reinforcing medium such as a glass cloth to form a reinforced magneto-dielectric material. A paste, grease, or slurry of the magneto-dielectric material can be prepared, for example, for use as a coating or a sealant. For isotropic magneto-dielectric materials, the magneto-dielectric material can be formed in the absence of an external magnetic field. Conversely, for anisotropic magneto-dielectric materials, the magneto-dielectric material can be formed in the presence of an external magnetic field. The external magnetic field can be 1 to 20 kilooersteds (kOe).

The magneto-dielectric material can be formed using an injection molding process comprising injection molding a molten magnetic composition comprising a polymer and the magnetic fibers.

The magneto-dielectric material can be prepared by reaction injection molding a thermosetting composition. The reaction injection molding can comprise mixing at least two streams to form a thermosetting composition and injecting the thermosetting composition into the mold, wherein a first stream can comprise a catalyst and the second stream can comprise an activating agent. One or both of the first stream and the second stream or a third stream can comprise a monomer. One or both of the first stream and the second stream or a third stream can comprise at least one of a cross-linking agent, a magnetic fiber, and an additive. One or both of the magnetic fiber and the additive can be added to the mold prior to injecting the thermosetting composition.

The mixing can occur in a head space of an injection molding machine. The mixing can occur in an inline mixer. The mixing can occur during injecting into the mold. The mixing can occur at a temperature of greater than or equal to 0 to 200° C., or 15 to 130° C., or 0 to 45° C., or 23 to 45° C.

The mold can be maintained at a temperature of greater than or equal to 0 to 250° C., or 23 to 200° C., or 45 to 250° C., or 30 to 130° C., or 50 to 70° C. It can take 0.25 to 0.5 minutes to fill a mold, during which time, the mold temperature can drop. After the mold is filled, the temperature of the thermosetting composition can increase, for example, from a first temperature of 0° to 45° C. to a second temperature of 45 to 250° C. The molding can occur at a pressure of 65 to 350 kilopascal (kPa). The molding can occur for less than or equal to 5 minutes, or less than or equal to 2 minutes, or 2 to 30 seconds. After the polymerization is complete, the magneto-dielectric material can be removed at the mold temperature or at a decreased mold temperature. For example, the release temperature, $T_r$, can be less than or equal to 10° C. less than the molding temperature, $T_m$ ($T_r \leq T_m - 10°$ C.).

After the magneto-dielectric material is removed from the mold, it can be post-cured. Post-curing can occur at a temperature of 100 to 150° C., or 140 to 200° C. for greater than or equal to 5 minutes.

The magneto-dielectric material can be a reinforced magneto-dielectric material, for example, comprising a glass cloth. The reinforced magneto-dielectric material can be formed by impregnating and laminating a composition comprising the polymer and the core-shell magnetic fibers onto a reinforcing medium. The reinforcing medium can be fibrous, for example, a woven or a non-woven fibrous layer. The reinforcing medium can have macroscopic voids allowing for the composition to fully impregnate the reinforcing medium. The reinforcing medium can comprise a glass cloth.

The magneto-dielectric material can be in the form of an article, for example, a layer, and further comprise a conductive layer, for example, copper. The conductive layer can have a thickness of 3 to 200 micrometers, or 9 to 180 micrometers. Suitable conductive layers include a thin layer of a conductive metal such as a copper foil presently used in the formation of circuits, for example, electrodeposited copper foils. The copper foil can have a root mean squared (RMS) roughness of less than or equal to 2 micrometers, or less than or equal to 0.7 micrometers, where roughness is measured using a Veeco Instruments WYCO Optical Profiler, using the method of white light interferometry.

The conductive layer can be applied by placing the conductive layer in the mold prior to molding, by laminating the conductive layer onto the magneto-dielectric material, by direct laser structuring, or by adhering the conductive layer to the substrate via an adhesive layer. For example, a laminated substrate can comprise an optional polyfluorocarbon film that can be located in between the conductive layer and the magneto-dielectric material, and a layer of microglass reinforced fluorocarbon polymer that can be located in between the polyfluorocarbon film and the conductive layer. The layer of microglass reinforced fluorocarbon polymer can increase the adhesion of the conductive layer to the magneto-dielectric material. The microglass can be present in an amount of 4 to 30 wt % based on the total weight of the layer. The microglass can have a longest length scale of less than or equal to 900 micrometers, or 50 to 500 micrometers. The microglass can be microglass of the type as commercially available by Johns-Manville Corporation of Denver, Colo. The polyfluorocarbon film comprises a fluoropolymer (such as PTFE), a fluorinated ethylene-propylene copolymer (such as TEFLON FEP), or a copolymer having a tetrafluoroethylene backbone with a fully fluorinated alkoxy side chain (such as TEFLON PFA).

The conductive layer can be applied by laser direct structuring. Here, the magneto-dielectric material can comprise a laser direct structuring additive, a laser is used to irradiate the surface of the substrate, forming a track of the laser direct structuring additive, and a conductive metal is applied to the track. The laser direct structuring additive can comprise a metal oxide particle (such as titanium oxide and copper chromium oxide). The laser direct structuring additive can comprise a spinel-based inorganic metal oxide particle, such as spinel copper. The metal oxide particle can be coated, for example, with a composition comprising tin and antimony (for example, 50 to 99 wt % of tin and 1 to 50 wt % of antimony, based on the total weight of the coating). The laser direct structuring additive can comprise 2 to 20 parts of the additive based on 100 parts of the respective composition. The irradiating can be performed with a YAG laser having a wavelength of 1064 nanometers under an output power of 10 Watts, a frequency of 80 kHz, and a rate of 3 meters per second. The conductive metal can be applied using a plating process in an electroless plating bath comprising, for example, copper.

Alternatively, the conductive layer can be applied by adhesively applying the conductive layer. In an aspect, the conductive layer is the circuit (the metallized layer of another circuit), for example, a flex circuit. For example, an adhesion layer can be disposed between one or both of the conductive layer(s) and the substrate. The adhesion layer can comprise a poly(arylene ether); and a carboxy-functionalized polybutadiene or polyisoprene polymer comprising butadiene, isoprene, or butadiene and isoprene units, and zero to less than or equal to 50 wt % of co-curable monomer units; wherein the composition of the adhesive layer is not the same as the composition of the substrate layer. The adhesive layer can be present in an amount of 2 to 15 grams per square meter. The poly(arylene ether) can comprise a carboxy-functionalized poly(arylene ether). The poly (arylene ether) can be the reaction product of a poly(arylene ether) and a cyclic anhydride, or the reaction product of a poly(arylene ether) and maleic anhydride. The carboxy-functionalized polybutadiene or polyisoprene polymer can be a carboxy-functionalized butadiene-styrene copolymer. The carboxy-functionalized polybutadiene or polyisoprene polymer can be the reaction product of a polybutadiene or polyisoprene polymer and a cyclic anhydride. The carboxy-functionalized polybutadiene or polyisoprene polymer can be a maleinized polybutadiene-styrene or maleinized polyisoprene-styrene copolymer. Other methods known in the art can be used to apply the conductive layer where admitted by the particular materials and form of the circuit material, for example, electrodeposition, chemical vapor deposition, lamination, or the like.

The conductive layer can be a patterned conductive layer. The magneto-dielectric material can comprise a first conductive layer and a second conductive layer located on opposite sides of the magneto-dielectric material.

An article can comprise the magneto-dielectric material. The article can be an antenna. The article can be a microwave device, such as an antenna or an inductor. The article can be a transformer, an antenna, an inductor, or an anti-electromagnetic interference material. The article can be an antenna such as a patch antenna, an inverted-F antenna, or a planar inverted-F antenna. The article can be a magnetic bus bar, for example, for wireless charging; an NFC shielding material; or an electronic bandgap meta-material.

The magneto-dielectric material can be used in microwave absorption or microwave shielding applications.

The article can be a multi-frequency article comprising the magneto-dielectric material and a dielectric material that comprises 0 to 2 vol % of the magnetic particles based on the total volume of the dielectric material. The dielectric material can comprise the same or different polymer as the magneto-dielectric material and the same or a different filler (for example, a dielectric filler or a flame retardant). The multi frequency article can be capable of being used as an antenna where the dielectric material operates at a first frequency range and a magneto-dielectric material operates at a second frequency range. For example, one of the magneto-dielectric material and the dielectric material can operate at frequencies of greater than or equal to a value of 6 to 8 GHz and the other can operate at frequencies of less than that value. The specific value of 6 to 8 can depend on the antenna type and the tolerance of the loss in that antenna.

Figure 6:
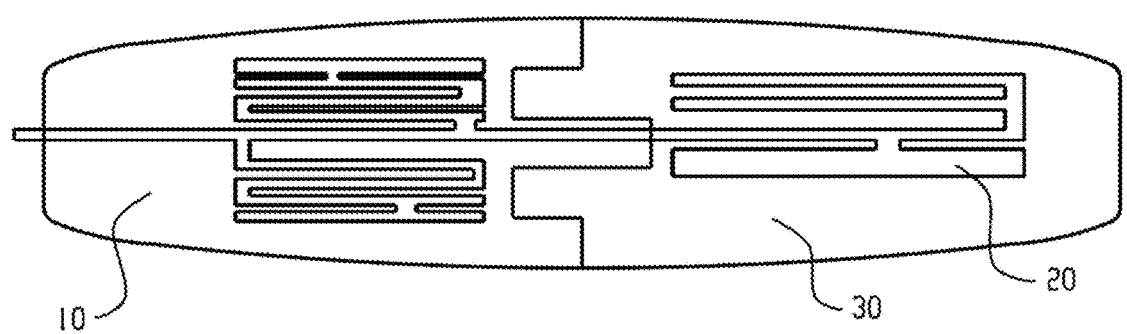
FIG. 6 is an illustration of an aspect of a dual frequency magneto-dielectric material.

FIG. 6 is an illustration of a top view of a multi frequency magneto-dielectric material, where conductive layer 20 is disposed on top of magneto-dielectric material 10 and dielectric substrate 30. FIG. 6 illustrates that the conductive layer 20 can be asymmetrical with respect to magneto-dielectric material 10 and dielectric substrate 30. Conversely, the conductive layer 20 can be symmetrical on magneto-dielectric substrate 10 and dielectric substrate 30. For example, the conductive layer can be patterned on each of the magneto-dielectric substrate and the dielectric substrate based on the desired radiation frequency and the substrate characteristics to resonate and radiate in the desired frequency range. The multi frequency magneto-dielectric material can be formed by a two-shot injection molding process (for example, of a thermoplastic or a thermoset material by reaction injection molding) comprising first injection molding one of the magneto-dielectric material and the dielectric material and then, second, injection molding the second of the magneto-dielectric material and the dielectric material.

The disclosed magneto-dielectric materials with high permeability, low dielectric constant, and low magnetic/dielectric loss at microwave frequencies offer unique properties suitable for the creation of small antennas for modern electronic communications. The unique magneto-dielectric materials are able to allow miniaturization of antenna elements without subsequent loss of bandwidth as is often seen in high dielectric constant substrates. Therefore, the magneto-dielectric materials are particularly advantageous in miniaturization of antennas with broad bandwidth, which are widely used in personal mobile phones, base stations, and the like. Moreover, the low magnetic loss magneto-dielectric materials are also advantageously used as high frequency or microwave inductors in modern communication systems. Microwave antennas and inductors are both vital components in advanced microwave communication systems The following examples are provided to illustrate the present disclosure. The examples are merely illustrative and are not intended to limit devices made in accordance with the disclosure to the materials, conditions, or process parameters set forth therein.

EXAMPLE

Precursor fibers are prepared by centrifugal spinning of an ethanol/water (weight/weight ratio=3:2) solution containing $Fe(NO_3)_3 \cdot 9H_2O$, $Ni(CH_3COO)_2 \cdot 4H_2O$, and polyvinylpyrrolidone (PVP). The spinning solution contained 12 wt. % metal salts and 9 wt. % PVP. The precursor fibers are dried in an oven at 80° C. to remove solvent, and then calcined at 600° C. to remove PVP. The calcined fibers are reduced in an atmosphere of 5 vol. % $H_2$ and 95 vol. % Ar at 400° C. to synthesize the FeNi shell.

Set forth below are non-limiting aspects of the magnetic fibers, magneto-dielectric materials, methods of making, and articles thereof.

Aspect 1: A magnetic fiber comprises a core comprising a spinel ferrite of formula $Me_{1-x}M_xFe_yO_4$, wherein Me is Mg, Mn, Fe, Co, Ni, Cu, Zn, or a combination thereof, preferably Me is Ni, Mn, Co, Mg, Li, or a combination thereof; M is Zn, Mg, Co, Cu, Al, Cr, Mn, or a combination thereof, x=0 to 0.25, and y=1.5 to 2.5, wherein the core is solid or at least partially hollow; and a shell at least partially surrounding the core, and comprising a $Me_{1-x}M_xFe_y$ alloy, wherein when the core is solid with Me=Ni and x=0 the magnetic fiber has a diameter of greater than 0.3 micrometer Aspect 2: The magnetic fiber of aspect 1, having a diameter of 0.1 micrometer to 20 micrometers, preferably having a diameter of 0.3 micrometer to 10 micrometers.

Aspect 3: The magnetic fiber of any one or more of the foregoing aspects, wherein the core is in the form of a tube.

Aspect 4: The magnetic fiber of any one or more of the foregoing aspects, wherein the core is the form of a tube and the inner diameter of the core has an average value of 0.01 micrometer to 3 micrometers, preferably the inner diameter has an average value of 0.05 micrometer to 1 micrometer.

Aspect 5: The magnetic fiber of any one or more of the foregoing aspects, wherein the core is solid.

Aspect 6: The magnetic fiber of any one or more of the foregoing aspects, having a length of 0.5 micrometer to 5000 micrometers, 3 micrometers to 4000 micrometers, or 1 micrometer to 1000 micrometers.

Aspect 7: The magnetic fiber of any one or more of the foregoing aspects, having an aspect ratio of 5 to 20,000, or 5 to 5000, or 5 to 1000

Aspect 8: The magnetic fiber of any one or more of the foregoing aspects, wherein the spinel ferrite has an average grain size of 10 nanometers to 500 nanometers, preferably 10 nanometers to 100 nanometers.

Aspect 9: The magnetic fiber of any one or more of the foregoing aspects, wherein the shell thickness is 20 nanometers to 2 micrometers, preferably 50 nanometers to 500 nanometers.

Aspect 10: A method of making the magnetic fiber of any one or more of aspects 1 to 9, comprising preparing a fiber from metal source compounds for the spinel ferrite; calcining the fiber to synthesize the spinel ferrite and obtain the core; and reducing the core in an atmosphere comprising hydrogen, nitrogen, argon, or a combination thereof to form the shell of the magnetic fiber; preferably the atmosphere comprises hydrogen.

Aspect 11: The method of aspect 10, wherein reducing the core is performed at a temperature of 100° C. to 1000° C.

Aspect 12: The method of aspect 10 or 11, wherein the metal source compounds are soluble in water or ethanol.

Aspect 13: The method of any one or more of aspects 10 to 12 wherein preparing the fiber comprises electrospinning, centrifugal spinning, or mechanical spinning of a solution comprising the metal source compounds Aspect 14: The method of any one or more of aspects 10 to 13 further comprising reducing the magnetic fiber to a desired length.

Aspect 15: A magneto-dielectric material comprising a polymer matrix; and a plurality of the magnetic fibers of any one or more of the preceding aspects; wherein the magneto-dielectric material has a magnetic loss tangent of less than or equal to 0.03 at 1 GHz.

Aspect 16: The magneto-dielectric material of aspect 15, comprising 10 to 80 volume percent of the plurality of magnetic fibers, based on the total volume of the magneto-dielectric material.

Aspect 17: The magneto-dielectric material of any one or more of aspects 15 to 16, wherein the magneto-dielectric material further comprises a dielectric filler, a thermoconductive filler, a flame retardant, or a combination thereof.

Aspect 18: The magneto-dielectric material of any one or more of aspects 15 to 17 wherein the thermoconductive filler is present, and comprises boron nitride, boron aluminum nitride, alumina, silica, natural graphite, copper, aluminum, magnesium oxide, zinc oxide, diamond powder, silver powder, or a combination thereof.

Aspect 19: The magneto-dielectric material of any one or more of aspects 15 to 18, wherein the polymer matrix comprises a polycarbonate, a polystyrene, a polyphenylene ether, a polyimide (e.g., polyetherimide), a polybutadiene, a polyacrylonitrile, a poly(C1-12 alkyl)methacrylate (e.g., polymethylmethacrylate), a polyester (e.g., poly(ethylene terephthalate), poly(butylene terephthalate), or polythioester), a polyolefin (e.g., polypropylene, high density polyethylene, low density polyethylene, or linear low density polyethylene), a polyamide (e.g., polyamideimide), a polyarylate, a polysulfone (e.g., polyarylsulfone or polysulfonamide), a poly(phenylene sulfide), a poly(phenylene oxide), a polyethers (e.g., poly(ether ketone), poly(ether ether ketone), polyethersulfone (PES)), a polyacrylic, a polyacetal, a polybenzoxazoles (e.g., polybenzothiazole or polybenzothiazinophenothiazine), a polyoxadiazole, a polypyrazinoquinoxaline, a polypyromellitimide, a polyquinoxaline, a polybenzimidazole, a polyoxindole, a polyoxoisoindoline (e.g., polydioxoisoindoline), a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyacetal, a polyanhydride, a vinyl polymer (e.g., a poly(vinyl ether), a poly(vinyl thioether), a poly(vinyl alcohol), a poly(vinyl ketone), a poly(vinyl halide) (such as polyvinylchloride), a poly(vinyl nitrile), or a poly(vinyl ester)), a polysulfonate, a polysulfide, a polyurea, a polyphosphazene, a polysilazane, a polysiloxane, a fluoropolymer (e.g., poly(vinyl fluoride), poly(vinylidene fluoride), fluorinated ethylene-propylene, poly(tetrafluoroethylene), or poly(ethylene-tetrafluoroethylene)), or a combination thereof; preferably wherein the polymer matrix comprises a poly(ether ether ketone), a poly(phenylene oxide), a polycarbonate, a polyester, an acrylonitrile-butadiene-styrene copolymer, a styrene-butadiene copolymer, a styrene-ethylene-propylene copolymer, a nylon, or a combination thereof.

Aspect 20: A method of making the magneto-dielectric material of any one or more of aspects 15 to 19, the method comprising: combining a polymer, a plurality of the magnetic fibers, optionally a solvent, and optionally an additive composition to form a composition; optionally removing the solvent from the composition; and cooling the composition to provide the magneto-dielectric material.

Aspect 21: The method of aspect 20, further comprising shaping the magneto-dielectric material.

Aspect 22: The method of aspect 21, wherein shaping the magneto-dielectric material comprises compression molding, injection molding, reaction injection molding, extruding, rolling, casting, or impregnating or laminating onto a reinforcing medium.

Aspect 23: An article comprising the magneto-dielectric material of any one or more of aspects 15 to 19 or made by the method of any one or more of aspects 20 to 22.

Aspect 24: The article of aspect 23, wherein the article is an antenna, a transformer, an anti-electromagnetic interference material, or an inductor.

Aspect 25: The article of aspect 23 or 24, wherein the article is a microwave device.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

The terms "a" and "an" do not denote a limitation of quantity, but rather denote the presence of at least one of the referenced item. The term "or" means "and/or" unless clearly indicated otherwise by context. The endpoints of all ranges directed to the same component or property are inclusive of the endpoints, are independently combinable, and include all intermediate points. Disclosure of a narrower range or more specific group in addition to a broader range is not a disclaimer of the broader range or larger group. A "combination thereof" is open and includes combinations of one or more of the named elements optionally together with one or more like element not named.

Unless defined otherwise, technical and scientific terms used herein have the same meaning as is commonly understood by one of skill in the art to which this disclosure belongs. The term "combination" is inclusive of blends, mixtures, alloys, reaction products, and the like. The permittivity and the permeability as used herein can be determined at a temperature of 23° C.

Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. Thus, while certain combinations of features have been described, it will be appreciated that these combinations are for illustration purposes only and that any combination of any of these features can be employed, explicitly or equivalently, either individually or in combination with any other of the features disclosed herein, in any combination, and all in accordance with an aspect. Any and all such combinations are contemplated herein and are considered within the scope of the disclosure.

While the disclosure has been described with reference to exemplary aspects, it will be understood by those skilled in the art that various changes can be made and equivalents can be substituted for elements thereof without departing from the scope of this disclosure. In addition, many modifications can be made to adapt a particular situation or material to the teachings without departing from the essential scope thereof.

Therefore, it is intended that the disclosure not be limited to the particular aspect disclosed as the best or only mode contemplated for carrying out this invention, but that the disclosure will include all aspects falling within the scope of the appended claims.

What is claimed is:

1. A magnetic fiber, comprising:
a core comprising a spinel ferrite of formula $Me_{1-x}M_xFe_yO_4$, wherein
Me is Mg, Mn, Fe, Ni, Cu, Zn, or a combination thereof,
M is Zn, Mg, Cu, Al, Cr, Mn, or a combination thereof,
x=0 to 0.25, and
y=1.5 to 2.5,
wherein the core is solid or at least partially hollow; and
a shell at least partially surrounding the core, and comprising a $Me_{1-x}$, $M_xFe_y$ alloy,
wherein when the core is solid with Me=Ni and x=0 the magnetic fiber has a diameter of greater than 0.3 micrometer.

2. The magnetic fiber of claim 1, having a diameter of 0.1 micrometer to 20 micrometers.

3. The magnetic fiber of claim 1, wherein the core is in the form of a tube.

4. The magnetic fiber of claim 1, wherein the core is the form of a tube and the inner diameter of the core has an average value of 0.01 micrometer to 3 micrometers.

5. The magnetic fiber of claim 1, wherein the core is solid.

6. The magnetic fiber of claim 1, having a length of 0.5 micrometer to 5000 micrometers.

7. The magnetic fiber of claim 1, having an aspect ratio of 5 to 20,000.

8. The magnetic fiber of claim 1, wherein the spinel ferrite has an average grain size of 10 nanometers to 500 nanometers.

9. The magnetic fiber of claim 1, wherein the shell thickness is 20 nanometers to 2 micrometers.

10. A method of making the magnetic fiber of claim 1, comprising
preparing a fiber from metal source compounds for the spinel ferrite;
calcining the fiber to synthesize the spinel ferrite and obtain the core; and
reducing the core in an atmosphere comprising hydrogen, nitrogen, argon, or a combination thereof to form the shell of the magnetic fiber.

11. The method of claim 10, wherein reducing the core is performed at a temperature of 100° C. to 1000° C.

12. The method of claim 10, wherein the metal source compounds are soluble in water or ethanol.

13. The method of claim 10 wherein preparing the fiber comprises electrospinning, centrifugal spinning, or mechanical spinning of a solution comprising the metal source compounds.

14. The method of claim 10 further comprising breaking the magnetic fiber to a desired length.

15. A magneto-dielectric material comprising:
a polymer matrix; and
a plurality of the magnetic fibers of claim 1;
wherein the magneto-dielectric material has a magnetic loss tangent of less than or equal to 0.03 at 1 GHz.

16. The magneto-dielectric material of claim 15, comprising 10 to 80 volume percent of the plurality of magnetic fibers, based on the total volume of the magneto-dielectric material.

17. The magneto-dielectric material of claim 15, wherein the magneto-dielectric material further comprises a dielectric filler, a thermoconductive filler, a flame retardant, or a combination thereof.

18. The magneto-dielectric material of claim 15 wherein the thermoconductive filler is present, and comprises boron nitride, boron aluminum nitride, alumina, silica, natural graphite, copper, aluminum, magnesium oxide, zinc oxide, diamond powder, silver powder, or a combination thereof.

19. The magneto-dielectric material of claim 15, wherein the polymer matrix comprises a polycarbonate, a polystyrene, a polyphenylene ether, a polyimide, a polybutadiene, a polyacrylonitrile, a poly(C1-12 alkyl)methacrylate, a polyester, poly(butylene terephthalate), or polythioester), a polyolefin, a polyamide, a polyarylate, a polysulfone, a poly(phenylene sulfide), a poly(phenylene oxide), a polyether, a polyacrylic, a polyacetal, a polybenzoxazoles, a polyoxadiazole, a polypyrazinoquinoxaline, a polypyromellitimide, a polyquinoxaline, a polybenzimidazole, a polyoxindole, a polyoxoisoindoline, a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyacetal, a polyanhydride, a vinyl polymer, a polysulfonate, a polysulfide, a polyurea, a polyphosphazene, a polysilazane, a polysiloxane, a fluoropolymer, or a combination thereof.

20. A method of making the magneto-dielectric material of claim 15, the method comprising:
combining a polymer, a plurality of the magnetic fibers, optionally a solvent, and optionally an additive composition to form a composition;
optionally removing the solvent from the composition; and
cooling the composition to provide the magneto-dielectric material.

21. The method of claim 20, further comprising shaping the magneto-dielectric material.

22. The method of claim 21, wherein shaping the magneto-dielectric material comprises compression molding, injection molding, reaction injection molding, extruding, rolling, casting, or impregnating or laminating onto a reinforcing medium.

23. An article comprising the magneto-dielectric material of claim 15.

24. The article of claim 23, wherein the article is an antenna, a transformer, an anti-electromagnetic interference material, or an inductor.

25. The article of claim 23, wherein the article is a microwave device.

* * * * *